March 5, 1957 D. J. MUNROE 2,783,951
RECORDER-REPRODUCER WINDING MECHANISM
Filed July 29, 1950 9 Sheets-Sheet 2

Inventor
David J. Munroe
By Mason, Kolehmainen, Rathburn & Wyss
Attorneys

March 5, 1957  D. J. MUNROE  2,783,951
RECORDER-REPRODUCER WINDING MECHANISM
Filed July 29, 1950  9 Sheets-Sheet 4

Inventor
David J. Munroe
By
Mason, Kolehmainen, Rathburn & Wyss
Attorneys

March 5, 1957  D. J. MUNROE  2,783,951
RECORDER-REPRODUCER WINDING MECHANISM
Filed July 29, 1950  9 Sheets-Sheet 5

Inventor
David J. Munroe
By
Mason, Kolehmainen, Rathburn & Wyss
Attorneys

March 5, 1957 D. J. MUNROE 2,783,951
RECORDER-REPRODUCER WINDING MECHANISM
Filed July 29, 1950 9 Sheets-Sheet 6

Inventor
David J. Munroe
By Mason, Kolehmainen, Rathburn & Wyss
Attorneys

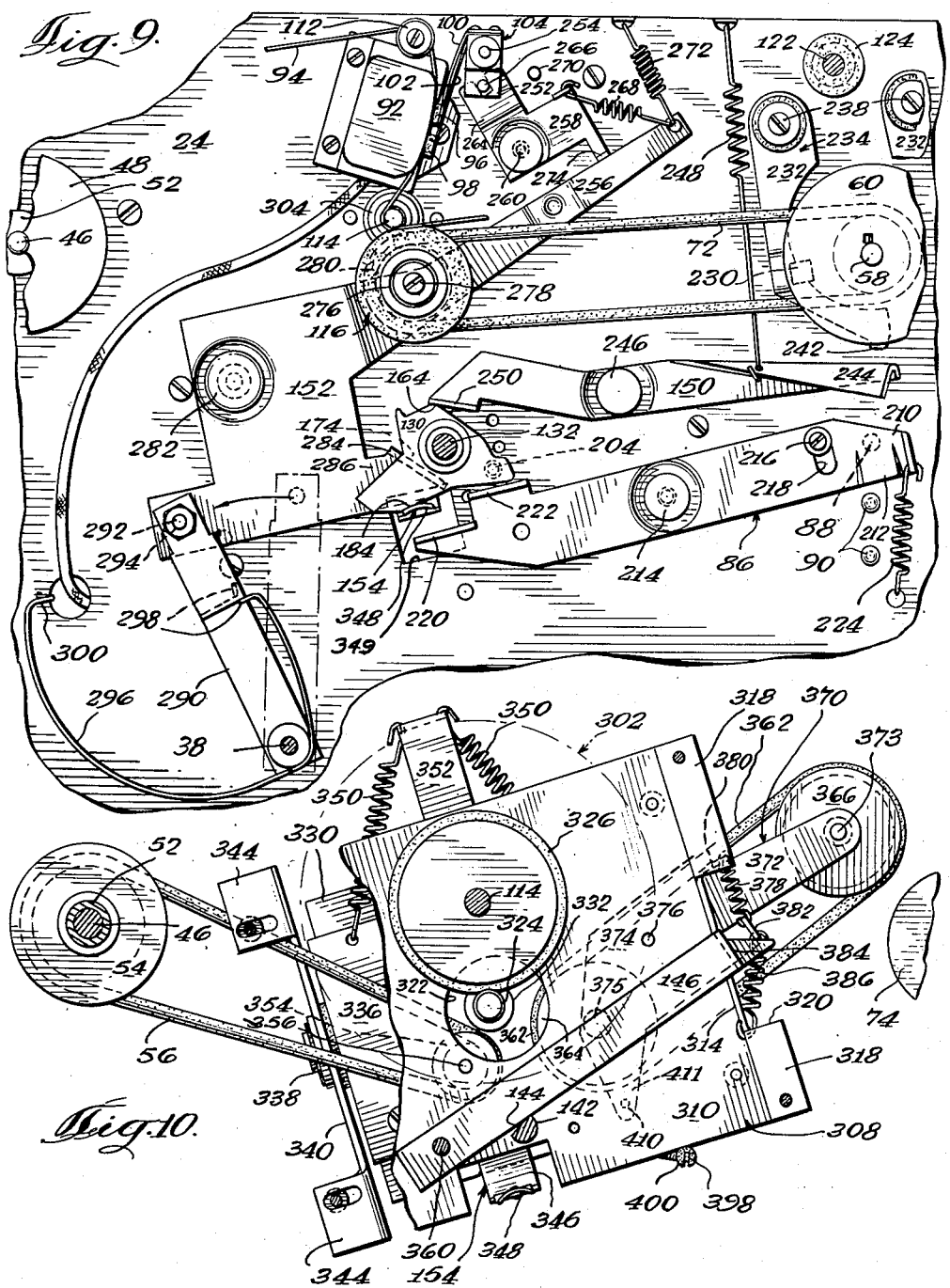

March 5, 1957 — D. J. MUNROE — 2,783,951
RECORDER-REPRODUCER WINDING MECHANISM
Filed July 29, 1950 — 9 Sheets-Sheet 8
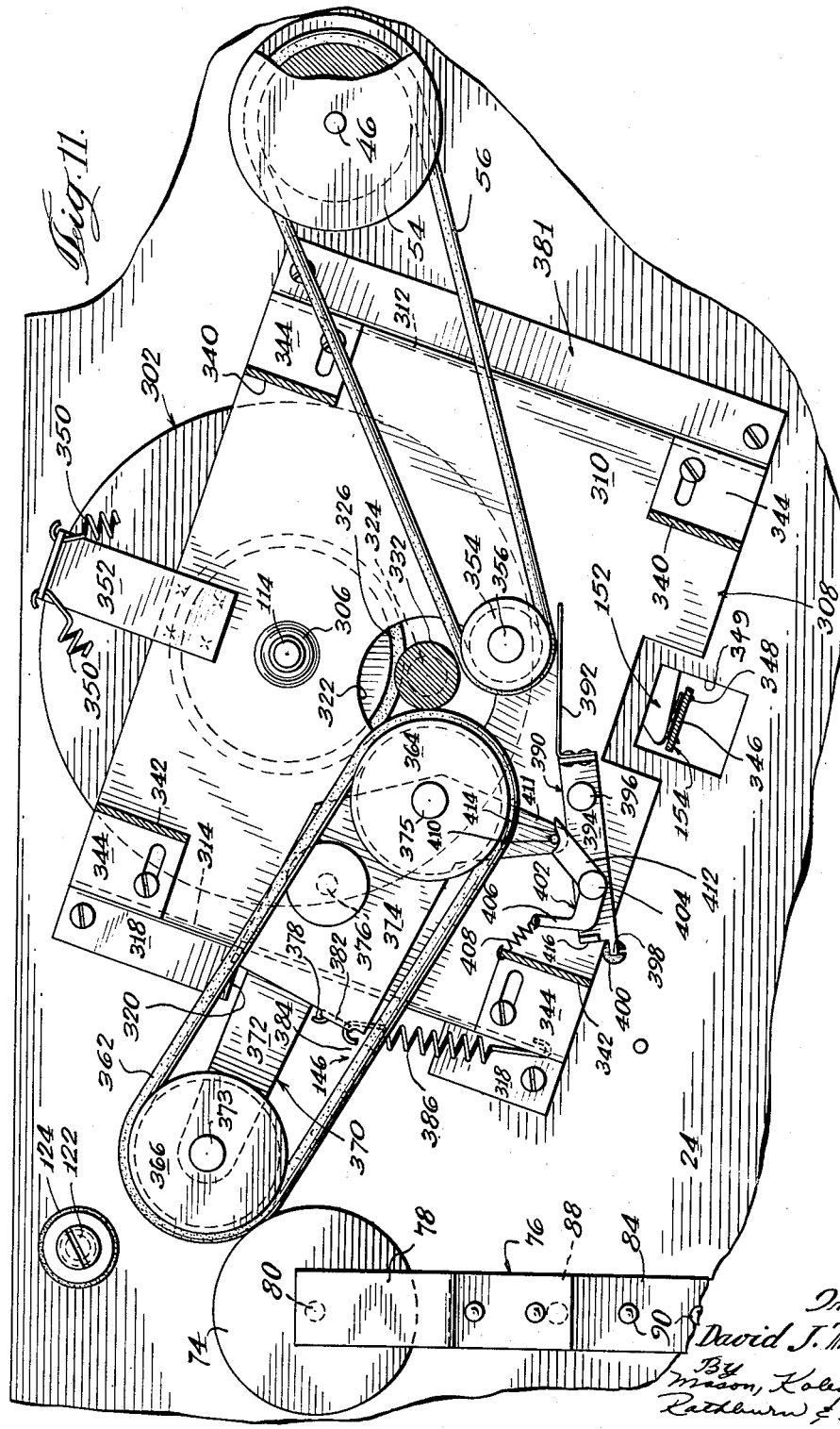

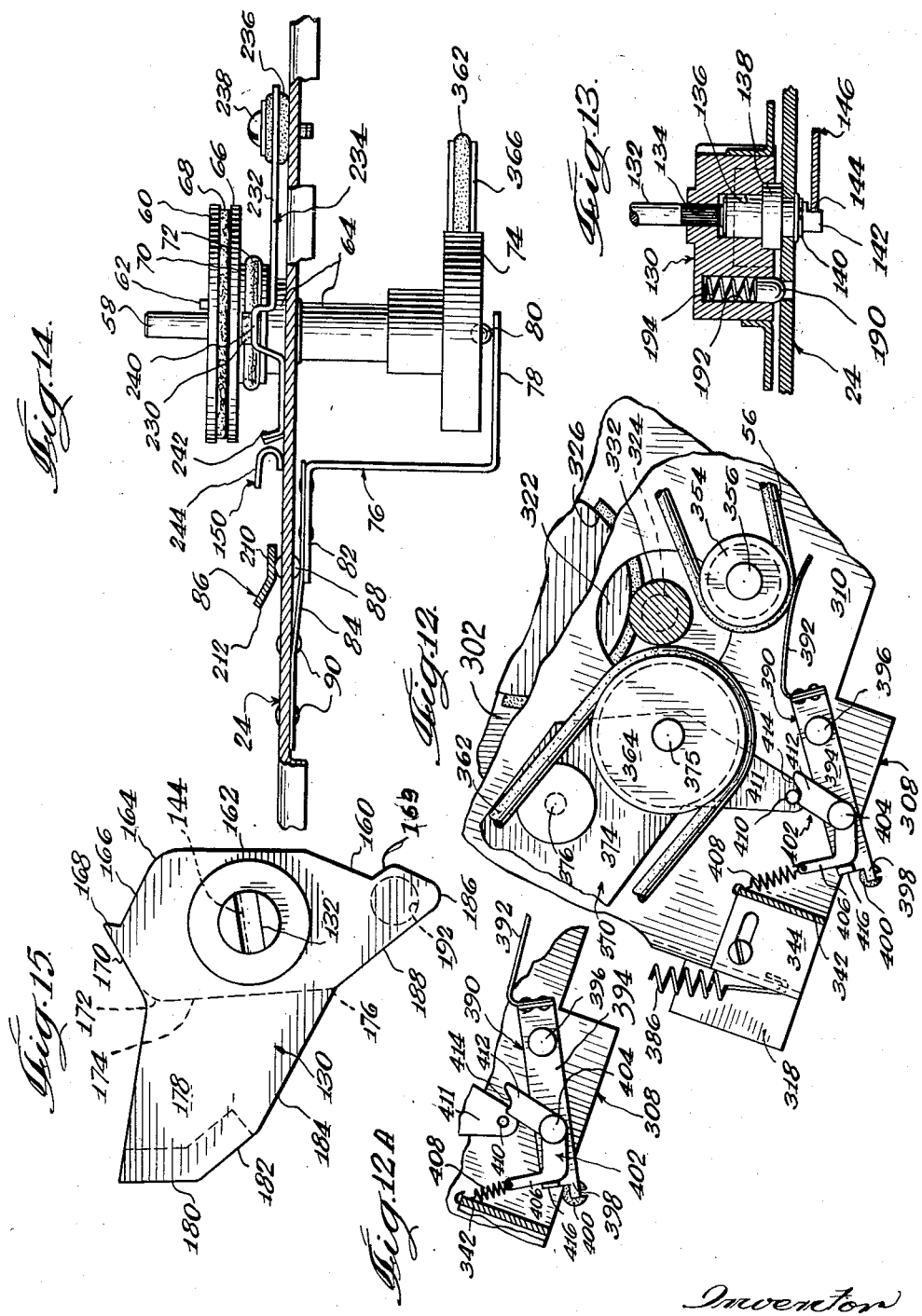

_United States Patent Office_

2,783,951
Patented Mar. 5, 1957

2,783,951

RECORDER-REPRODUCER WINDING MECHANISM

David J. Munroe, Racine, Wis., assignor to Webster Electric Company, Racine, Wis., a corporation of Delaware Application July 29, 1950, Serial No. 176,576

18 Claims. (Cl. 242—55)

The present invention relates to a recorder-reproducer and component parts thereof, and has for its primary object the provision of a new and improved apparatus of this character.

Recorders and reproducers, especially of the magnetic type, have remained relatively heavy, cumbersome, and complicated despite the considerable effort that has been given to their simplification. Generally, the apparatus has remained quite heavy and the construction has been relatively complicated and expensive and not unlikely to get out of order.

The present invention has for one of its objects the provision of a new and improved recording and/or reproducing apparatus provided with control and operating mechanisms that are relatively simple in construction and operation, light in weight, and which enable the apparatus to be made relatively inexpensively and yet be portable and reliable in operation.

Another of the objects of the present invention is the provision of an apparatus which can be economically constructed and in which most of the controls driving mechanisms, driving motor and sound equipment chassis are mounted upon a mounting plate which is suspended from a top plate detachably secured to a cabinet.

Another object of the present invention is to provide new and improved driving arrangements for driving a supply spool in a direction to rewind the record medium, such as a magnetic tape, thereon.

A further object of the present invention is to provide a new and improved take-up spool drive apparatus whereby the spool can be driven at what may be termed a standard forward speed and which apparatus can be readily conditioned for operation at this speed by movement of a driving motor.

A further object of the present invention is the provision of a new and improved take-up spool driving arrangement including what may be termed a gravity-operated clutch which can be readily braked in a desired condition of the apparatus, for example, in a stop condition.

A still further object of the present invention is to provide an improved arrangement for driving the take-up spool in what may be termed a fast forward direction whereby selected portions of a tape may be brought quickly into position for reproduction or recording. This drive is characterized by a belt and pulley arrangement that is shiftable to engage the motor with the take-up spool.

A further object of the present invention is the provision of a new and improved simplified driving arrangement for driving the tape selectively in forward or rewind direction as well as at a fast forward speed.

A further object of the present invention is the provision of a new and improved braking arrangement for preventing excessive feeding of the tape from the supply spool upon termination of the fast forward drive.

Other objects of the present invention reside in providing new and improved guiding means for the tape so that it can be effectively driven at a constant rate in forward direction along one path and rewound at high speed and but slight hinderance in the opposite direction along another path.

The apparatus of this invention is an improvement upon the apparatus disclosed and claimed in my co-pending application Serial No. 408,235, filed February 4, 1954, as a continuation of my application Serial No. 79,663, filed March 4, 1949, now abandoned, and assigned to the assignee of this application.

Other objects and advantages of the present invention will become apparent from the ensuing description of an illustrative embodiment thereof, in the course of which reference is had to the accompanying drawings, in which:

Fig. 1 is a fragmentary top elevational view of a recorder-reproducer constructed in accordance with the present invention. In the view the apparatus is illustrated in its stop position. Only part of the cabinet is shown and the cover has been omitted entirely;

Figs. 9 and 10 are also views similar to Figs. 5 and 6, but with the apparatus conditioned for forward operation;

Fig. 11 is a fragmentary plan sectional view, in full scale, taken along the line 11—11 of Fig. 2 and with the apparatus conditioned for fast forward operation;

Fig. 12 is a fragmentary view similar to Fig. 11 illustrating the operation of the fast forward brake and showing the brake effective to brake the supply spool, as it is briefly upon completion of the fast forward operation;

Fig. 12A is a fragmentary view similar to Fig. 12, but showing the fast forward brake in its forward condition;

Fig. 13 is a sectional view through the main control cam assembly taken along the line 13—13 of Fig. 3;

Fig. 14 is a fragmentary elevational view of the apparatus conditioned for forward operation taken from the take-up spool end, i. e., along the line 14—14 of Fig. 2 and illustrating details of the take-up spool clutch and brake; and Fig. 15 is a plan view of the main control cam.

The apparatus of the present invention may be utilized with various types of record media. It is particularly designed for use with an elongated magnetizable record medium such as a tape coated or impregnated with magnetic material. The apparatus includes a recording device for varying the condition of the medium or tape in accordance with intelligence, the recording device imparting a controlled degree of the condition to an incremental length of the medium in accordance with time variations in said intelligence.

The apparatus of the present invention is characterized, among other things, by the ease and simplicity with which it may be conditioned for the performance of the various functions that are performed by the apparatus and the safeguards which are provided to prevent accidental operation thereof into a condition in which the record upon the medium might be accidentally destroyed. It is characterized further by its light weight, portability, its simplified and therefore less expensive control and operating mechanisms. In brief, the control is such that the recorder-reproducer can be conditioned for the performance of the functions of (1) recording, (2) reproducing or listening, (3) rewinding, (4) fast forward operation and (5) a stop condition. The control includes a main or central control knob mounted at a readily accessible position of the apparatus, for example, at the center of a raised portion of a top plate and movable from what may be termed a normal stop position to a rewind position and also to forward and fast forward positions. The control includes also a selector knob movable from a normal play or reproduce position, to which it is biased, to a record position in which position it will remain only if the main control knob is in its forward position.

Figure 1:
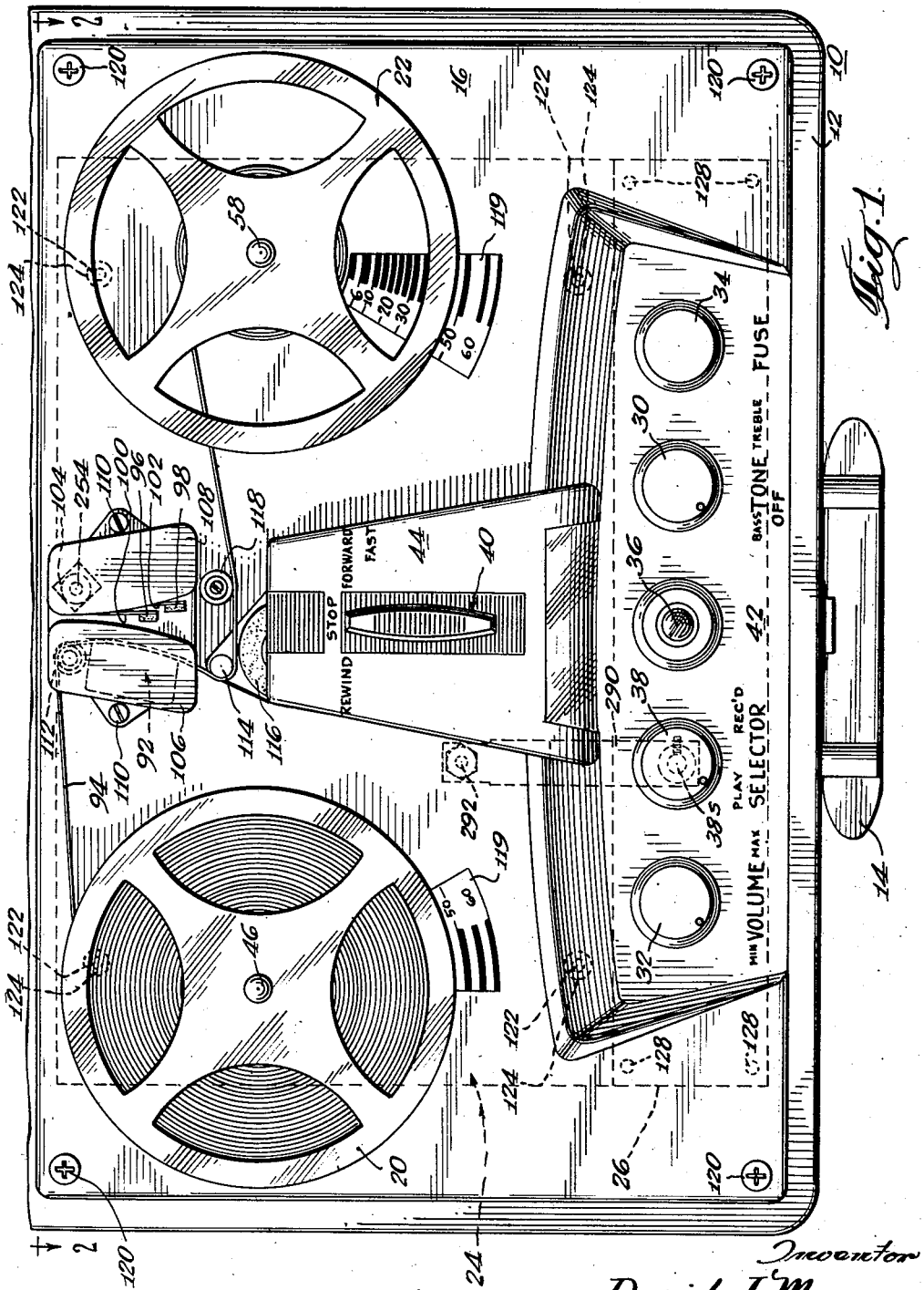
Figure 2:
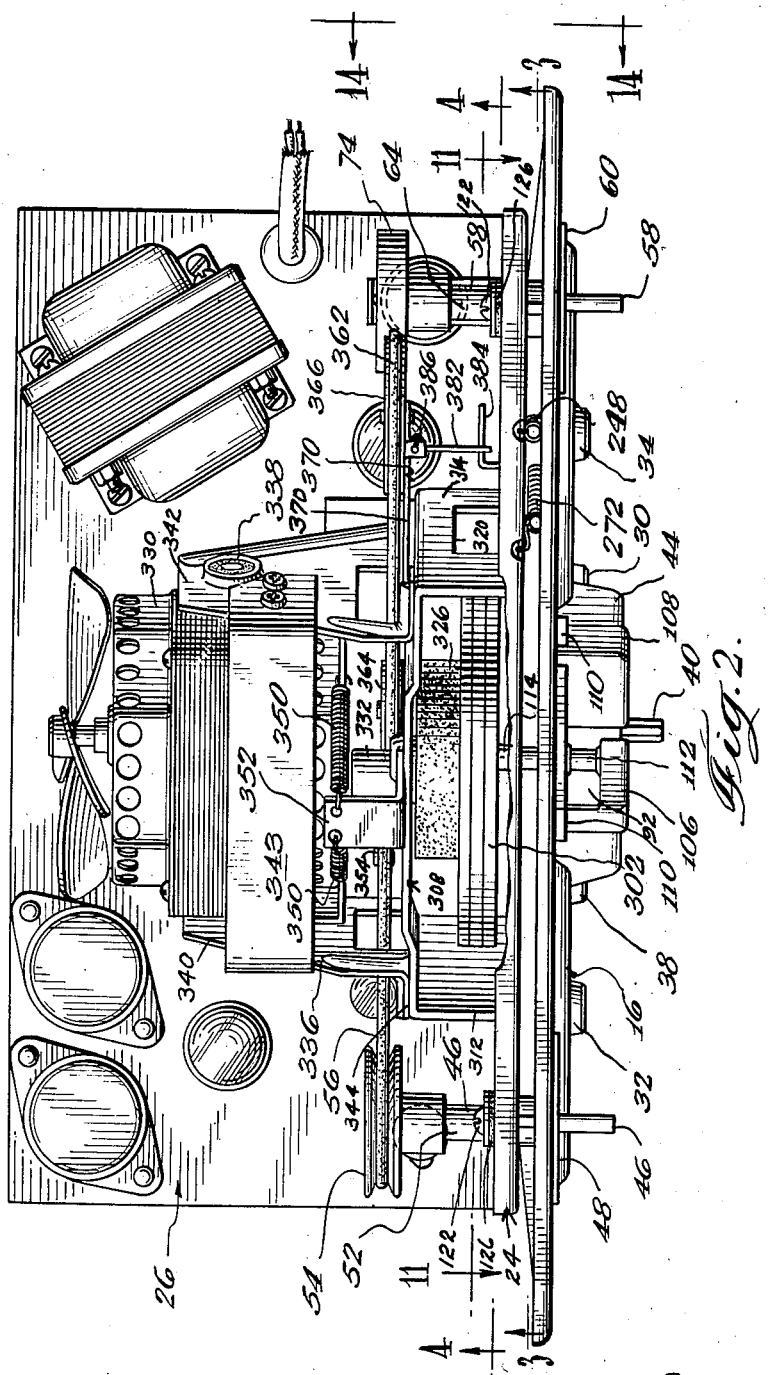
Fig. 2 is a rear elevational view of the apparatus taken on the line 2—2 of Fig. 1, this and the following figures all omitting the cabinet.

Reference is had first particularly to Figs. 1 and 2, particularly the former. In this figure the apparatus is illustrated as a magnetic recorder-reproducer, the device as a whole being indicated by reference character 10. It includes a suitable portable cabinet 12 adapted to be closed by a cover, not shown, but which may be hingedly and detachably connected to the cabinet. The cabinet is of relatively small size and is adapted to be carried by a suitable handle, such as 14, which is secured to the front wall of the cabinet. Fig. 1, as heretofore noted, is a top plan view of the device with the cover removed. When the cover is removed, a top plate 16 is open to view, as are a tape supply spool or reel 20 and a take-up spool 22 and various controls, etc., to which reference will be had shortly.

Most of the component parts are located inside of the cabinet. Among the parts so located are the power supply, sound equipment, not shown, but which may be of conventional construction. Also located inside of the cabinet and supported in novel manner from the top plate are a mounting plate 24, upon which the operating and control mechanisms are mounted along with the sound equipment chassis 26.

As is apparent from Fig. 1, the various controls are readily accessible. Among these are a tone control 30, with which is associated a power switch; a volume control 32; a removable fuse housing 34; a recording volume indicator light 36; a play-record selector 38, and the main control knob 40. All but the main control knob are mounted in a narrow recess 42 located at the front of the top plate, while the main control knob is placed above a central generally trapezoidal upstanding portion 44 of the top plate.

The supply spool 20 is removably mounted upon a supply spool shaft 46, to which is fixedly secured a spool supporting plate 48 having an upstanding spool engaging pin 50. The shaft is rotatably journaled in a bearing 52 mounted in the mounting plate. The shaft is driven by a pulley 54 secured to the end of the shaft extending below the mounting plate, see particularly Fig. 2, and which is adapted selectively to be driven in rewinding the tape in a manner to be described hereinafter by a rewind belt 56.

The take-up spool 22 is adapted to be supported upon and driven by the take-up spool shaft 58, to which is secured a spool supporting plate 60, having an upstanding spool engaging projection 62. The shaft is rotatably journaled by a bearing 64 mounted in the mounting plate, but in such manner that it has some axial movement, whereby the shaft and thus the take-up spool may be selectively freed for high speed rotation, as in rewind or fast forward operation, or gravity clutched in standard forward drive during recording and reproducing, or positively braked when the apparatus is in its stop condition. The so-called gravity clutching is afforded by a drive disc 66 mounted for free rotation upon the shaft 58 below the spool supporting plate 60. A felt washer 68 is interposed between the plate and disc, it being cemented to the under side of plate 60. The construction is thus such that when the shaft and plate are free to move downwardly, the weight thereof effectively clutches the supporting plate to the drive disc.

The take-up spool drive disc 66 is driven at standard forward speed through a pulley 70, preferably integral with the disc, driven by a forward drive belt 72 in the novel manner to be described hereinafter. The take-up spool is adapted also to be driven by a fast forward drive disc 74 fixedly secured to the end of shaft 58 depending below the mounting plate, see Fig. 2.

The clutching of the take-up spool shaft and supporting plate 60 are controlled by a clutch controlling lift lever 76 adapted to disengage the clutch in the rewind and fast forward positions by lifting the shaft 58, see Figs. 2 and 14, the latter of which illustrates the clutch engaged in its standard forward drive. The lift lever 76 is generally Z-shaped and has a free end 78 disposed below the drive disc 74 in the bottom of which is secured a small thrust ball bearing 80 enabling the disc and the take-up spool supply shaft and spool to be rotated easily even when the shaft is lifted by the lever. The other end 82 of the lift lever is connected to and supported by a leaf spring 84, which normally holds the end 82 of the lever 76 against the under side of the mounting plate 24, and thus tends to move lever 76 to disengage the clutch. The spring is moved away from the plate, i. e., downwardly, to gravity engage the clutch (as illustrated in Fig. 14) by a clutch control lever 86 mounted at the upper side of the mounting plate, as will be described hereinafter and, which acts on the lever through a ball 88 disposed between the levers in an opening in the mounting plate. The leaf spring 84 may be secured to the mounting plate in suitable manner, as by rivets 90.

The recording medium, in this case magnetic tape, is initially wound on the supply spool 20. It is adapted to be wound upon the take-up spool 22 at either the so-called standard forward or fast forward speed. In the standard forward speed, a record can be made upon the tape or a record previously made may be reproduced or played back, dependent upon the position of selecter 38. The apparatus includes a transducer 92 mounted between the spools near the rear side and upon the mounting plate 24. It projects above the top plate 16 through an aperture in the latter so that the tape can move past the record-reproduce and erase core portions thereof, as illustrated in Fig. 1. The transducer itself may take the form disclosed in my co-pending application Serial No. 176,575, filed July 29, 1950, now Patent No. 2,668,878.

The tape, which is indicated by the reference character 94, is held against the transducer by a pair of pressure pads 96 and 98, which serve to hold the tape against the record-reproduce and erase portions of the transducer, respectively. The pressure pads are mounted at the free ends of leaf springs 100 and 102 mounted upon a movable bracket 104, mounted upon the mounting plate but extending above the top plate, which is movable to engage the tape in the standard forward drive in a manner to be described hereinafter. The transducer and pressure pads are protected and the openings through which they extend above the top plate are covered by covers 106 and 108 detachably secured to the top plate by removable screws 110.

The tape is guided in its movement between the spools and past the transducer by a gear guide roller 112 mounted on the mounting plate substantially immediately back of the transducer. A rotatable capstan 114 extending above the top plate is mounted in front of the transducer, and is provided to drive the tape at a constant slow speed in the forward condition in cooperation with a selectively movable rubber tired pinch roller 116 mounted in front of it. A second guide roller 118 mounted on the top plate is disposed beneath the pressure pads. It, in accordance with a feature of the present invention, is so located relative to guide roller 112 that if desired, as during rewinding, the tape can be freed from the capstan and guided by the rollers alone, thereby to make the rewinding operation somewhat easier because the tape doesn't have to be dragged around the capstan. This is perhaps even more desirable because the capstan is slightly knurled to facilitate driving of the tape.

To enable the user of the apparatus to use the apparatus with greater facility, tape footage (playing time) indicia 119 are disposed on the top of the top plate underneath the spools.

Figure 3:
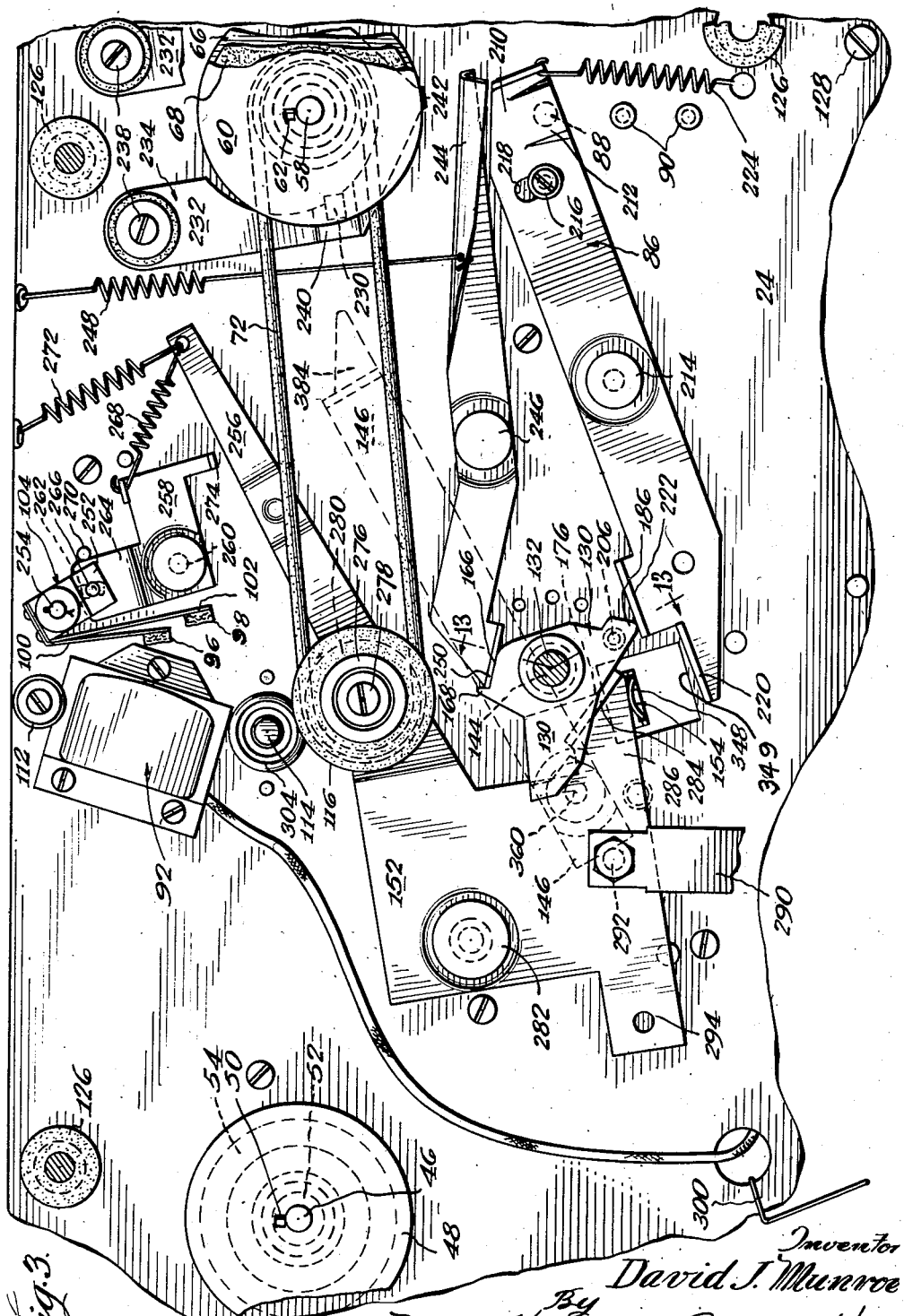
Fig. 3 is a fragmentary top plan view, in full scale, with the apparatus conditioned for fast forward operation. The view is taken along the line 3—3 of Fig. 2, and in this and the following figures, the top plate has also been omitted.

In accordance with one of the features of the present invention, the apparatus is constructed with a top plate detachably secured to the cabinet and a mounting plate detachably secured beneath the top plate and supporting most of the mechanism and also the sound equipment chassis. Referring now to Figs. 1, 2 and 3, first to Fig. 1, the top plate 16 is detachably secured to the cabinet by a plurality of removable screws 120, one at each corner of the plate. The mounting plate 24 is suspended from the top plate by the four screws 122 in cooperation with internally threaded dependent posts 124 formed integrally with the top plate. The posts pass through rubber grommets 122 secured in the mounting plate, thereby sufficient as to provide a cushioned support for the mechanism.

The chassis for the sound recording and reproducing equipment is secured underneath the mounting plate by the four removable screws 128.

The simplified control of the present invention includes as previously indicated the main control 40 operable to condition the mechanism for rewind, stop, standard forward (hereinafter referred to as forward) and fast forward. Associated with it is the selector 38 operable to condition the apparatus for play and record. The main control includes the knob 40 connected to a main cam 130 forming part of what may be termed a cam and shaft assembly, including also the shaft 132, to the upper end of which the knob is secured and to the lower end of which the cam 130 is secured. (See Fig. 15 for the shape of the cam and Fig. 13 for a section through the assembly.)

The main cam is provided with an opening 134 into which an intermediate portion of shaft 132 is fitted, as with a press fit. It is also provided with an enlarged shouldered lower opening 136, into which a shaft bearing 138 extends, by means of which the cam and shaft assembly is rotatably supported upon the mounting plate 24, the assembly being held in assembled relation by suitable means such as a C-washer 140. A portion 142 of the shaft extends below the mounting plate, and it is provided with a cam defining flat 144 cooperatively associated with a lever 146 forming part of what is called a fast forward control, the construction and operation of which will be described in greater detail hereinafter.

The main cam 130 includes a number of operative cam surfaces associated with the previously mentioned clutch control lever 86, a take-up spool brake control lever 150, a main control lever 152 and a motor position control lever 154. The cam surfaces cooperating with the brake control lever 150 are the flat surface 160, the flat surface 162, the rounded surface 164 and the flat surface 166, these being effective in the rewind, stop, forward and fast forward positions, respectively. The cam includes also a limit position determining projections 168 and 169 cooperating with the lever 150 to determine the limits of movement of the cam in a clockwise direction in the fast forward position and in a counterclockwise position in the rewind position.

The cam surfaces cooperating with the main control lever 152 are the flat surface 170, the rounded surface 172, the flat surface 174 and the rounded surface 176, effective in the four positions of the control. These cam surfaces, it should be noted, are at the under side of the cam and are made possible by providing the under side of the cam with a recess 178.

The surfaces cooperating with the clutch control and motor positioning levers are the flat surface 180, the flat surface 182, the flat surface 184 and the round surface 186 formed at the end of the flat 188, effective in the rewind, stop, forward and fast forward positions, respectively. Surfaces 180 and 182 cooperate with the motor positioning control lever 154 and through the latter with the clutch control lever 86. Surface 184 cooperates only with the motor position control lever and surface 186 only with the clutch control lever.

In order to facilitate movement of the main control knob into its desired positions and to hold it there, a position detent mechanism is provided. This mechanism includes, see particularly Fig. 13, a spring pressed detent 190 slidably mounted in a recess 192 in the cam. The detent is pressed against the mounting plate by a spring 194, whereby the cam assembly is held in selected positions determined by engagement of the rounded lower end of the detent with the apertures 200, 202, 204, 206 for the rewind, stop, forward and fast forward positions, respectively.

Figure 7:
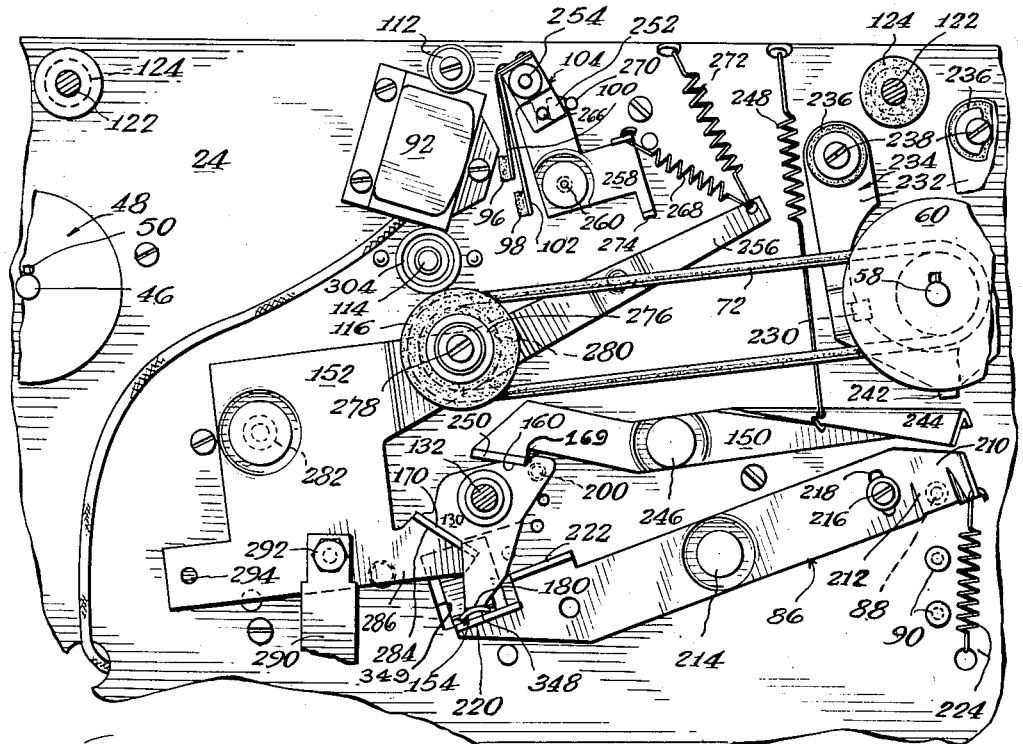
Figs. 7 and 8 are views similar to Figs. 5 and 6 with the apparatus conditioned for rewind operation.

The clutch, it may be remembered, is controlled by the clutch control lever 86 and the lift lever 76, which are interconnected by the ball 80. The lift lever, it will also further be remembered, is moved downwardly to enable the clutch to be gravity engaged in the stop and forward positions. At this time the end 210 of the lever engages the ball to push it and the lever downwardly. In the rewind and fast forward positions, as illustrated in Figs. 7 and 3, respectively, the clutch is disengaged by movement of the clutch control lever enabling the ball to move upwardly into a recess underneath the portion 212 of the lever.

The clutch control lever 86 is mounted for pivotal movement above the axis of a pin 214 securing the lever to the upper side of the mounting plate 24. The vertical position of the end 78 of the clutch operating lift lever 76 is adjustable by adjusting the free end of lever 86 by screw 216 fitting in a slot 218 in the lever between the pivot and the free end of the lever. The lever is, as previously set forth, controlled by the cam. The cam end of the lever has two upstanding projections or flanges which engage the cam. One of these is the flange 220, which extends in front of the motor positioning lever 154, and which determines, in cooperation with the cam, the position of the lever in the rewind and stop positions. The other flange 222 is cooperatively associated with cam portion 186 to determine the position of the lever in the fast forward position. The lever is held in cooperative relationship with the cam and biased in a counterclockwise direction by a biasing spring 224 secured to the outer end of the lever and to the mounting plate.

The take-up spool brake, which is controlled by the lever 150, is effective only in the stop position. At this time, the brake pads 230 engage the under side of and lift the takeup spool drive disc 66 effectively to engage the take-up spool supporting plate and to jam the spool support against its bearing 64, thereby effectively to brake the spool. The brake pads are mounted at diametrically opposite points relative to the disc 66 upon the arms 232 of a generally U-shaped brake yoke secured to the upper side of the mounting brake by the rubber grommets 236 and securing screws 238, see particularly Figs. 3 and 14. The pads are mounted upon upwardly extending bent-up portions 240 of the yoke. The central portion of the bight of the yoke is bent upwardly at an angle, as indicated by the reference character 242, to provide means whereby the upward movement of the rounded end portion 244 of the brake control lever 150 will effect upward movement of the brake pads.

The brake control lever 150 is pivotally mounted intermediate its ends upon a pivot pin 246 and is biased for movement in a counterclockwise direction by the biasing spring 248 secured between the free end and pivot point of the lever and to the mounting plate. The cam end of the lever is provided with an upwardly extending flange 250, which engages the cam surfaces 160, 162, 164 and 166 in various positions of the cam and which also engages the movement limiting projections 168 and 169 on the cam.

The pressure pads utilized to hold the tape against the transducer are controlled through the main control lever 152. The pads, it will be remembered, are mounted at the end of leaf springs 100 and 102, which are fixedly secured to a bracket 104 of generally U shape and having one arm 252 somewhat longer than the other. The bracket is rotatably supported upon a shaft 254 extending upwardly from and secured to the mounting plate. The longer arm 252 is operatively connected to the free end of an arm 256 forming part of the main control lever through a generally right angular lever 258 pivotally secured to the mounting plate intermediate its ends by a pivot pin 260. The lever 258 is connected to arm 252 of bracket 104 by a pin and slot connection including a slot 262 upon the upwardly extending arm 264 of the lever 258 and a pin 266 secured to the arm 252. The lever 258 is biased for movement in a clockwise direction by a biasing spring 268, and its movement in this direction is limited by a stop pin 270. One end of the spring 268 is connected to the lever 258 and the opposite end to the free end of lever arm 256. The free end of this arm is biased upwardly (the main control lever 152 thus being biased for movement in a counter-clockwise direction) by a biasing spring 272 that is somewhat heavier than spring 268.

The pressure pads are engaged with the tape only in the forward position of the main control. In this position the control lever 258 is moved to the position indicated in Fig. 9 by the arm 256 of the main control lever 152 which engages a flange 274 formed on the lever 258. In all positions other than the forward position the flange 274 is free of lever arm 256 and the spring 268 disengages the pressure pads.

The engagement of the pinch roller 116 with the capstan to effect forward drive of the tape is controlled by the cam 130 through the main control lever 152, the latter operating the pinch roller into engagement with the capstan in the forward position of the control knob 40. In the other positions, the pinch roller is disengaged from the capstan. The pinch roller includes a metallic hub 276 rotatably mounted upon a shaft 278 secured to an intermediate portion of the main control lever so that the pinch roller moves with the control lever, the construction and arrangement being such that the pinch roller engages the capstan only in the forward position, as illustrated in Fig. 9.

The pinch roller is utilized to drive the take-up spool through the belt 72. For this purpose the pinch roller hub is formed integrally with a driving pulley 280, about which the belt runs, this pulley being located below the pinch roller and adjacent the upper side of lever 152.

The main control lever 152, so called, is pivotally secured to the upper side of the mounting plate by a pivot pin 282. The control lever is cooperatively associated with the cam 130 by an angularly disposed flange 284 extending upwardly from a lower arm 286 of the lever.

In order to prevent accidental erasure of records from the tape, the main control and selector control are interlocked so that the selector control will not remain in its record position except in the forward position of the main control. This interlock is simply provided in a manner disclosed and claimed in the co-pending application of George B. Shields, Serial No. 440,515, filed June 30, 1954, as a continuation-in-part of application Serial No. 203,290, filed December 29, 1950, now abandoned, and assigned to the assignee of this application. The interlock is provided by a generally rearwardly extending arm 290 secured to the selector knob 38 and the shaft 38S to which the knob is secured. The lever is of spring material and carries a detent ball 292 at its outer end for cooperation with an opening 294 in the front left-hand corner of lever 152, which opening is so located that the ball enters it only in the forward position; see Fig. 9. In this position of the lever, the arm 290 is held by the ball and main control lever to maintain the selector knob 38 in the record position against the return force exerted thereon by a wire spring 296 having an end 298 secured to the arm and an end 300 secured to the mounting plate 24. In the record position, knob 38 conditions the apparatus for recording and in the play or reproduce position it conditions the apparatus for playing.

Figure 6:
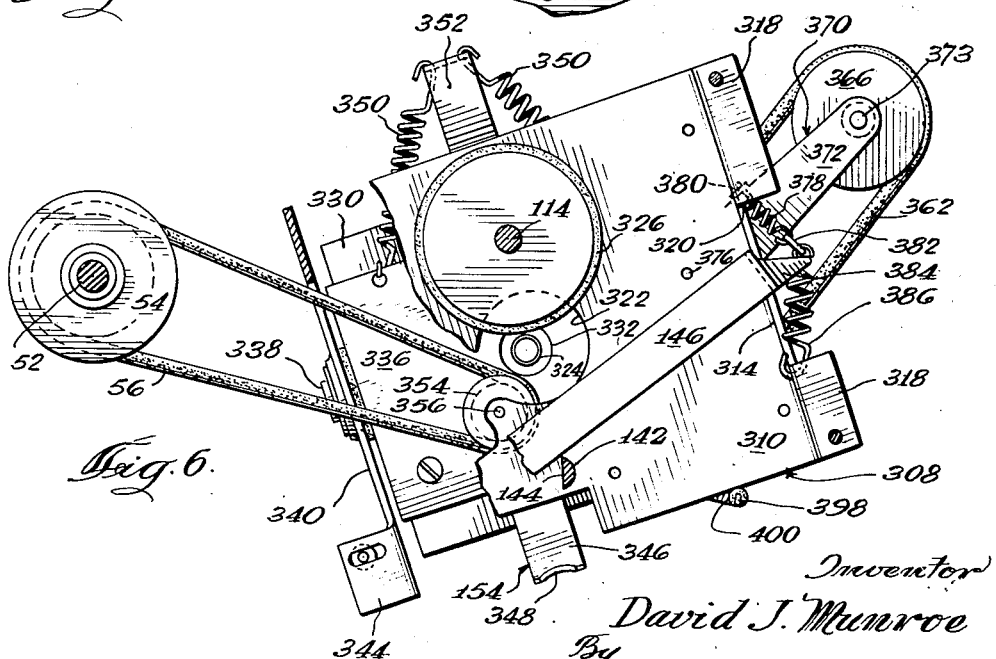

The capstan 114 is constituted by the knurled end portion of a shaft forming part of what may be termed a fly wheel-capstan assembly, including also a fabricated fly wheel 302 secured to the capstan defining shaft. This assembly is mounted in bearings 304 and 306 mounted, respectively, in the mounting plate 24 and in a generally channel-shaped support bracket 308 suspended from and located below the mounting plate. The support bracket includes a bight portion 310 generally parallel to the mounting plate in which the bearing 306 is mounted and spaced upwardly extending side portions 312 and 314 which terminate in flanges 318 by means of which the bracket is secured in place. The side portion 314 is apertured to provide an opening for the fast forward control lever 146, as indicated by the reference character 320 in Fig. 6. The bight is apertured substantially centrally as indicated by the reference character 322 for the passage of a motor driven drive wheel 324 which is adapted to engage and drive the capstan fly wheel assembly in the forward position of the main control knob. At this time the drive wheel 324 engages a rubber tired driven wheel 326 forming part of the fly wheel-capstan assembly and secured for rotation with both the fly wheel and the capstan. The fly wheel assembly is also driven in the fast forward position of the control, but the tape is not driven by reason of the fact that the pinch roller is disengaged from the capstan.

The motor, which is indicated by the reference character 330, drives not only the capstan driving wheel 324, but also a larger diameter drive wheel 332, the two drive wheels being mounted adjacent to each other on the motor shaft. The larger diameter drive wheel is utilized in the rewind and fast forward position as will be described in detail shortly.

The motor, in accordance with another of the features of the present invention, is movably mounted and is moved under the control of the main cam 130 selectively to drive the supply spool in rewinding the tape, to drive the fly wheel capstan assembly and take-up spool in the forward position, to drive the fast forward drive of the take-up spool in the fast forward position, and to be free of all drives in the stop position. The motor is mounted in a generally U-shaped cradle 336, supported in spaced trunnions 338 rotatably journaled in generally trapezoidal shaped supporting plates 340 and 342 having flanged feet 344 whereby the motor and its cradle are suspended below the supporting bracket 308. The plates are connected at the back by a strengthening strap 343.

The motor assembly is operatively connected to the main cam 130, as heretofore indicated, by the motor position controlling lever 154. This lever includes a generally right angled portion 346 attached to the cradle and to the upwardly extending portion of which is attached a resilient cam engaging portion 348, the cam engaging portion being round as clearly apparent from many of the figures and extending through an aperture 349 in the mounting plate. The cam engaging portion is held against the cam by a pair of motor biasing springs 350, having their front ends secured to the cradle and their rear ends to a right angled bracket 352 projecting rearwardly from and secured to the support bracket 308.

Figure 8:
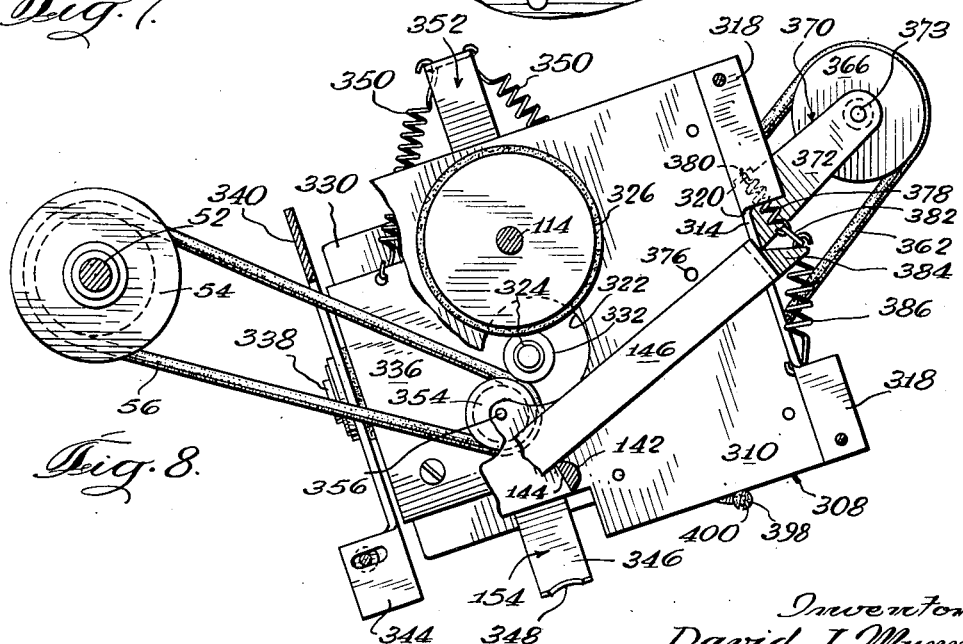

When the device is conditioned for rewinding the tape, as illustrated in Figs. 7 and 8, the motor is moved to engage the larger diameter drive wheel 332 with the rewind drive. This is expeditiously done by engaging the drive wheel with the rewind driving belt 56 where it goes around a drive pulley 354, see particularly Fig. 8, which is journaled for rotation on a shaft 356 secured to and extending a slight distance below the bight 310 of the support bracket 308.

Figure 4:
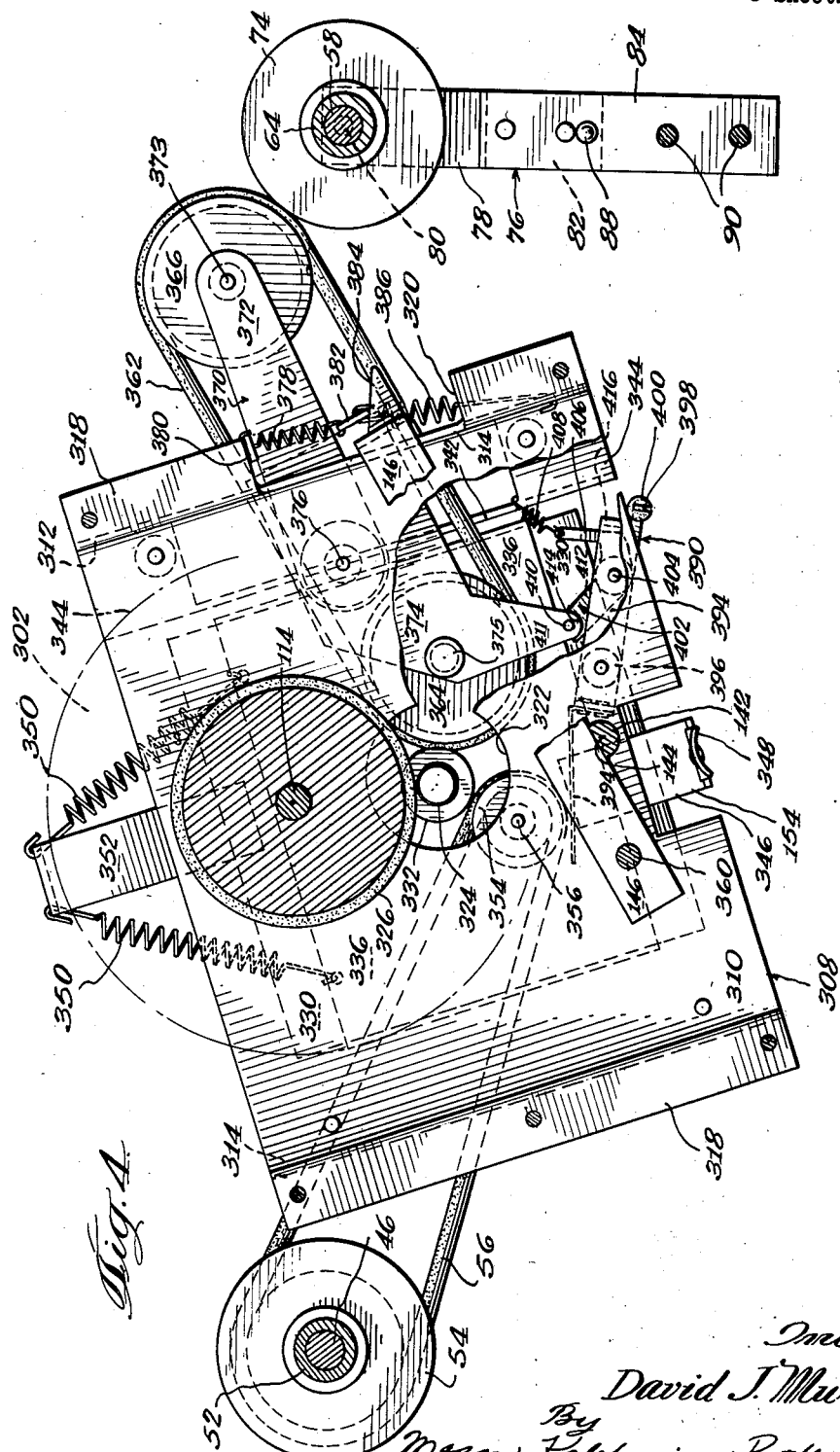
Fig. 4 is a fragmentary plan sectional view, also in full scale, of the apparatus conditioned for fast forward operation, the view being taken along the line 4—4 of Fig. 2.

Another feature of the present invention resides in the construction of the fast forward drive and its associated control. The control, it may be remembered, is effected through the main cam 130 and the lever 146, the position of which is controlled by the extension 142 of the main cam shaft and the flat 144 thereof. The arrangement is such that when the flat is fully engaged by the front edge of the lever 146, as illustrated in Fig. 4, then the fast forward drive is rendered effective. In the other positions of the flat, see Figs. 5, 7 and 10, the lever 146 is rotated somewhat counterclockwise around its pivot pin thereby to render the fast forward drive ineffective, this by moving the fast forward drive belt 362 and the spaced driving and driven pulleys 364 and 366, respectively, out of engagement with the larger diameter motor drive wheel 332 and the fast forward drive disc 74 through which the take-up spool is driven at fast speed in a forward direction. In the fast forward position the belt drivingly interconnects the larger drive wheel 332 and the take-up spool drive disc 74 as best illustrated in Fig. 4.

The fast forward pulleys 364 and 366 are mounted upon a composite lever consisting of the relatively movable lever arms 372 and 374 movable about a common pivot pin 376 mounted on the bight 310 of the support bracket 308. The arm 372 carries the driven pulley 366 and the arm 374 carries the driving pulley 364 at its free end. The arms 372 and 374 are constrained for unitary movement by a small spring 378 connected at its rear end to a flange 380 extending upwardly from the rear edge of arm 372 and a flange 382 extending a substantial distance upwardly from the right end of the arm 374. The spring thus maintains the lever 374 in engagement with the flange 382 in opposition of the control, except in the fast forward position. In this position the pulleys 364 and 366 engage the drive wheels 332 and drive disc 74, and to insure a good driving action the arrangement is such that the lever arms separate somewhat as indicated by the bracket marked "space" in Figs. 4 and 11.

The movement of the composite lever is controlled by the control lever 146, specifically by the triangular free end portion 384 thereof, which engages the front edge of the flange 382. This flange and the arm 374 to which it is connected are biased in a clockwise direction and held against the triangular end 384 of the control lever by a biasing spring 386 connected to the flange and to the side wall 314 of the support bracket 308.

In order to prevent undesirable discharge of tape from the supply spool upon completion of fast forward speed operation, the supply spool is braked for a brief period by novel braking means. The braking means, indicated as a whole by reference character 390, includes a resilient braking member in the form of a leaf spring 392, engageable with the rewind belt 56, see particularly Figs. 4, 11, and 12, and a lever 394 at one end of which the spring is mounted. The lever is pivotally mounted intermediate its ends below the bight 310 of the support bracket 308, upon a pivot pin 396. At its opposite end the lever is provided with an upwardly extending abutment flange 398 covered with a rubber sleeve 400 engageable with the front of bight 310 to determine the position of the lever in the rewind, stop and forward positions.

The level is operatively connected to the main control cam in such manner that the brake is effective only momentarily as the control moves out of the fast forward position. This connection includes a generally U-shaped one-way acting lever 402 pivotally mounted on lever 394 by a pivot pin 404. An arm 406 of the lever is connected to the motor support plate 342 by spring 408 that holds the brake leaf and lever in what may be termed a normal position wherein the brake is disengaged and the brake operating pin 410 is free of lever 402 (see Fig. 12A).

The brake is rendered effective only on the return of the control from fast forward by the cooperative action of lever 402 and a pin 410, which is mounted on a forwardly extending portion 411 of the fast forward lever arm 374 and thus operatively connected to the main cam 130. In moving in the opposite direction, i. e., from forward (Fig. 12A) to fast forward (Fig. 12), the pin 410 rides over one corner of the other arm 412 of lever 402 (the lever pivoting in a clockwise direction as viewed in the mentioned figure) into the rounded "valley" 414 at the end of the arm. This, in effect, cocks the brake, as indicated in Fig. 4. Then upon return from fast forward to forward, the pin moves the lever 394 through lever 402, pivotal movement of which, in a counterclockwise direction, is prevented by a flange 416 on lever 394 which engages arm 406, as shown in Fig. 12.

The apparatus of the present invention is of such character that it can readily be transported from one place to another in its cabinet 12 by means of the handle 14. In order to place it into operation it can be supplied with power from a suitable source of current through a lead in connection, the supply of power being completed to the machine from the power source upon operation of the knob 30 to close the associated power switch. The circuit for this and the electrical components of the apparatus may be of conventional form and, therefore, have not been shown, the circuits for the most part being controlled by the played-record selector knob 38 and the switches operable by it.

Ordinarily, the control knob 40 is left in its stop position so that both the supply and take-up spools are braked, the supply spool by friction of its driving belt and pulleys, and the take-up spool by the brake pads 230.

In order better to explain the operation of the apparatus there is included below a summary of the positions of the more important elements in the various operative conditions of the apparatus.

*Summary of operation*

| Component | Rewind | Stop | Listen | Record | Fast Forward |
| --- | --- | --- | --- | --- | --- |
| Pressure Pad | Off | Off | On | On | Off. |
| Pinch Roller | Off | Off | On | On | Off. |
| Take-up Spool | Free, lift lever frees spool plate | Braked | Driven by capstan and gravity clutched. | Driven as in listen. | Driven by Fast Forward Drive and Free. |
| Take-up Spool Brake | Off | On | Off | Off | Off. |
| Take-up Spool Clutch | Free | Engaged by Brake | Engaged Gravity | Engaged Gravity | Free. |
| Supply Spool | Driven in reverse | Braked by friction of drive belt and pulley. | Braked as in stop | Braked as in stop | Braked as in stop. |
| Supply Spool Brake (Fast Forward) | Off | Off | Off | Off | On briefly on return to forward from Fast Forward. |
| Motor | Drives Supply Spool. | Free | Drives capstan and take-up spool. | Drives capstan and take-up spool. | Drives Fast Forward. |
| Capstan Flywheel | Free | do | Driven, drives pinch roller. | Driven, drives pinch roller. | Driven, Pinch Roller Free. |
| Fast Forward Drive | Ineffective | Ineffective | Ineffective | Ineffective | Effective. |

Figure 5:
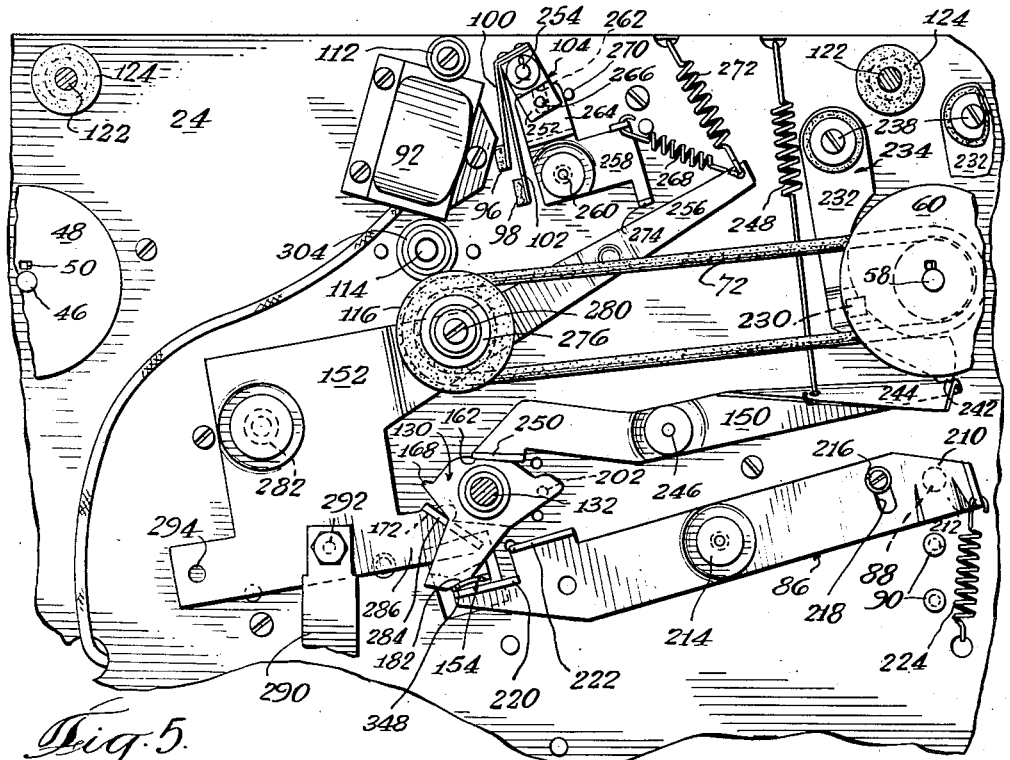
Figs. 5 and 6 are views similar to Figs. 3 and 4, but upon a reduced scale, illustrating the apparatus in its stop condition.

To place the apparatus in operation, the control knob 30 is turned enough to close the power switch associated with it. This energizes the driving motor 330 so that the latter rotates continually, driving the drive wheels 324 and 332, but these are disengaged from the driven elements in the stop position, as illustrated in Fig. 5. A spool or reel of tape is placed upon the supply spool shaft 46 and spool supporting plate 48 and threaded past the idler 112, transducer 92, capstan 114, and idler 118 and the end is fastened to the take-up spool. In the off position, referring more particularly to Figs. 5 and 6, the pressure pads are free of the tape; the pinch roller is disengaged from the capstan; the fast forward drive and brake are ineffective; and the capstan-flywheel assembly is not driven.

It is assumed that it is desired to make a recording. To do this a microphone is connected to a desired input jack of those supplied for high and low level inputs.

To make a recording the control 40 is operated to its forward position, and the selector 38 is operated to its record position. The result is the operation of the apparatus to a position as indicated in Figs. 9 and 10, together with the conditioning of the electrical circuits for recording. The pressure pads 96 and 98 hold the tape against the erase and record portions of the transducer; the pinch roller 96 holds the tape against the capstan 114 with the result that the tape is moved at the constant desired speed past the transducer so that the record is made upon the tape; the take-up spool brake is released and the spool is driven at a speed sufficiently high to take up the tape through the mechanism including the capstan, which is driven by the rollers 324 and 326, the pinch roller 116, the belt 74, the pulley 70, and the now gravity-engaged clutching elements 66, 68, and 60; and the supply spool is driven through the tape and it is prevented from over feeding by the heretofore mentioned frictional braking. Again, the fast forward drive is ineffective, the pulley 366 and belt 362 being out of engagement with the fast forward drive disc 74. Also, the motor drive wheel 332 is out of engagement with both the fast forward and rewind belts.

During the making of a record the recording volume is controlled by the control knob 32 and the recording volume is indicated by the light 36.

The length of the recording can be ascertained from observation of the playing time or footage indicia 119 on the top plate underneath the spools, which are preferably made of transparent material.

After the record has been made, or at any time that it is desired to terminate the recording operation, the control 40 can be turned to another position, for example, the stop position. Immediately that this is done, the interlock lever 290 is returned by its spring 296 to the play position thereby rendering the erase ineffective. Perhaps it should also be mentioned that the recording operation can be terminated without stoppage of the forward movement of the tape simply by operating the selector 38 to its play position.

When it is desired to play or reproduce the record, the tape is first rewound upon the supply spool. To do this, the control 40 is operated to the rewinding position, thereby moving various components of the apparatus into the positions indicated in Figs. 7 and 8. As illustrated, the pressure pads are disengaged from the tape, the pinch roller is moved away from the capstan, the take-up spool is freed by the lift lever 76 and its control lever 86; the motor is moved so as to render the rewind drive effective, this being achieved by engaging the drive wheel 332 with the rewind belt 56; the capstan-flywheel assembly is stationary by reason of disengagement of drive wheel 324 from the driven wheel 326; and the fast forward drive is ineffective.

The apparatus is conditioned for reproducing or playing by operation of the control 40 to its forward position. The selector 38 need not be operated because it normally occupies its play position. When conditioned for playing, the apparatus occupies the forward position as indicated in Figs. 9 and 10 and described above.

If it is desired to skip part of the recording and to reproduce a selected part only, the tape can be moved at high speed in a forward direction. To do this, the control 40 is moved to its fast forward position thereby moving the apparatus into the positions indicated in Figs. 3 and 4. At this time, the pressure pads are disengaged; the pinch roller is moved away from the capstan; the capstan-flywheel assembly continues to be rotated, the motor position being substantially unchanged; the take-up spool is driven at a fast tpeed which may be approximately twenty times normal speed through the fast forward drive including the pulleys 364 and 366, belt 362, and the fast forward drive disc 74; the take-up spool brake is off; and the clutch is freed by the lift lever. The fast forward brake 390 is conditioned for operation through the pin 410 and the lever 402.

When the fast forward drive is terminated by movement of the control 40 to any of its other positions, the fast forward brake 390 is effective momentarily in a manner heretofore described in detail to prevent excessive feed of tape. After the high speed forward operation has been terminated, the apparatus is conditioned for the play or reproduce operation, which continues in the manner described heretofore.

From the foregoing detailed description of the construction and operation of the apparatus of the present invention, it is evident that it possesses many advantageous features and that it is extremely simple, both in construction and in operation.

While the invention has been illustrated and described in connection with a recorder-reproducer, it is evident that many of the improvements are directed to different components and sub-combinations which are applicable to recorders and/or reproducers of various types as well as to apparatus other than magnetic and utilizing a tape as a recording medium. Accordingly, while the invention has been described in connection with the specific details of an illustrated embodiment thereof, it should be understood that these details are not intended to be limitative of the invention except insofar as set forth in the accompanying claims.

What is claimed as new and desired to be secured by Letters Patent of the United States is:

1. A recorder-reproducer utilizing an elongated record medium including, means including medium driving means comprising a single movably mounted motor, a capstan pinch roller drive, and a pair of medium holding spool drive shafts rotatable about spaced apart fixed axes for selectively driving the medium in opposite directions, and means including a uni-control device controlling said driving means and the position of said motor for conditioning the recorder-reproducer for (1) forward drive in which the motor is in one position and the capstan-pinch roller drive is effective, (2) rewind in which the motor is in a second position and one of the spool drive shafts is driven, and (3) high speed drive of the record medium in a forward direction in which the motor is in said one position, the capstan-pinch roller drive is ineffective, and the other spool drive shaft is driven.

2. A recorder-reproducer utilizing an elongated record medium including, means including medium driving means comprising a single movably mounted motor for selectively driving the medium in opposite directions, and means including a uni-control device controlling said driving means and the position of said motor for conditioning the recorder-reproducer for (1) forward drive at low speed, (2) rewinding, (3) high speed drive of the record medium in a forward direction, and (4) a stop condition, said last mentioned means including means maintaining said motor in one position for both the low and high speed drives, and separate drives for the said low and high speeds which are selectively rendered effective by said control device to effect said low and high speed forward drives.

3. A recorder-reproducer utilizing an elongated record medium, including supply spool supporting means, take-up spool supporting means, means including a driven pulley connected to said supply spool supporting means, a driving pulley, a belt interconnecting said pulleys and a first pivotally movable motor driven element for rotating said support in a direction to rewind the medium thereon, means including a capstan, a pinch roller movable to engage the capstan, a capstan driving wheel and a second motor driven element pivotally movable with the first for driving the tape in a forward direction at a standard forward speed, means including a pulley rotatable with said capstan, an axially and rotatably movable drive disc, and a plate engageable by the disc and connected to said take-up spool support for driving said take-up spool support in a direction to take up the medium driven by the capstan, means including pivotally movable belt connected driving and driven pulleys and a drive disc connected to said take-up spool support and of which the drive disc and said first motor driven element are engageable by said last named belt for driving said take-up spool support at a fast forward speed, means including a uni-control device for selectively moving said motor driven elements to engage said rewind drive belt and fast forward belt and freeing said disc from said plate for driving the supply spool in rewind direction and said take-up spool in fast forward direction, respectively, and means including said uni-control means for engaging said second motor driven drive element with said capstan driving wheel and engaging said take-up spool support plate and drive disc in standard forward drive, and means including said control means for disengaging said motor driven elements and braking means controlled by said control means for braking said take-up spool support through said drive disc and plate in a stop position of the uni-control device.

4. A recorder-reproducer utilizing an elongated record medium, including supply spool supporting means, take-up spool supporting means, means including a driven pulley connected to said supply spool supporting means, a driving pulley, a belt interconnecting said pulleys and a first pivotally movable motor driven element for rotating said support in a direction to rewind the medium thereon, means including a capstan, a pinch roller movable to engage the capstan, a capstan driving wheel and a second motor driven element pivotally movable with the first for driving the tape in a forward direction at a standard forward speed, means including a pulley rotatable with said capstan, an axially and rotatably movable drive disc, and a plate engageable by the disc and connected to said take-up spool support for driving said take-up spool support in a direction to take up the medium driven by the capstan, means including pivotally movable belt connected driving and driven pulleys and a drive disc connected to said take-up spool support and of which the drive disc and said first motor driven element are engageable by said last named belt for driving said take-up spool support at a fast forward speed, and means including a uni-control device for selectively moving said motor driven elements to engage said rewind drive belt and fast forward belt and freeing said disc from said plate for driving the supply spool in rewind direction and said take-up spool in fast forward direction, respectively, and means including said uni-control means for engaging said second motor driven drive element with said capstan driving wheel and engaging said take-up spool support plate and drive disc in standard forward drive.

5. In apparatus of the character including a rotatable record medium take-up spool support the combination including, a take-up spool support, means including a first belt drive adapted to have a driving connection with said spool support for driving it at a first speed in one direction, means including a second belt drive adapted to have a driving connection with said spool support for driving it at a second speed in the same direction, and means for selectively rendering said driving connections effective.

6. In apparatus of the character including a rotatable record medium take-up spool support the combination including, a take-up spool support, means including a first belt drive comprising a capstan, a selectively driven pinch roller driven by the capstan and drivingly connected to said belt and selectively engageable clutch means for driving said spool support at a first speed, means including a selectively positionally movable second belt drive for driving said spool support at a second speed, and means for selectively engaging said clutch means and moving said pinch roller into engagement with said capstan to render said first belt drive effective and moving said second belt drive to render the second belt drive effective.

7. An elongated record medium driving means including a rotatable driving member, power means for rotating said member, a spaced rotatable driven member, a record spool support rotated by said last mentioned member, and driving means normally drivingly disengaged from both said members and including movably mounted drivingly interconnected driving and driven elements and means including manually operable control means for simultaneously moving said elements for engaging said driving means with and drivingly connecting the driving and driven members, whereby said record spool support is rotated by said power means through said driving member, the interconnected driving and driven elements, and the driven member.

8. An elongated record medium driving means including a rotatable driving member, power means for rotating said member, a spaced rotatable driven member, a record spool support rotated by said last mentioned member, and means for selectively drivingly connecting the driving and driven members including a pair of spaced rotatable elements, a belt interconnecting said elements and normally spaced from both said members, oppositely extending relatively movable arms supporting said elements and movable about a common pivot point, and means including manually operable control means for effecting movement of said arms about said pivot point and relative to each other so as to bring said belt into engagement with said driving and driven members, whereby said power means drives the record spool support through the driving member, the spaced rotatable elements and belt, and the driven member.

9. In an elongated record medium driving apparatus, means including a capstan rotatable about a fixed axis and a pinch roller selectively movable to hold the tape against the capstan for moving the medium, a rotatable take-up spool support, a driving connection between the pinch roller and take-up spool support including a selectively engageable clutch and means including a movably mounted motor and means for selectively moving said motor drivingly to connect it to said capstan, moving said pinch roller to hold the tape against the capstan, and engaging said clutch for driving the medium and rotating said take-up spool support at one speed in one direction through the pinch roller, other means for rotating said take-up spool support at a second speed in said one direction, and means for moving the pinch roller away from the capstan, disengaging said clutch, and for rendering said other driving means effective for rotating the take-up spool support at said second speed.

10. In an elongated record medium driving apparatus, means for moving the medium, a rotatable take-up spool support, a support drive including a clutch comprising a rotatable and axially movable disc engageable by said support, said support being movable axially to engage the disc, support braking means including braking means movable axially relative to the disc and engageable with said disc and moving it axially to engage the support, means for effecting movement of said support to engage said clutch and rendering said medium moving means effective, and means for rendering said driving means ineffective and for moving said braking means axially to render said braking means effective.

11. In an apparatus as claimed in claim 10 wherein said means for effecting movement of said support to engage said clutch includes a selectively operable lever movable to move said spool support away from the disc or to permit movement of said support to engage said disc.

12. In an apparatus as claimed in claim 11 wherein said means for effecting movement of said support to engage said clutch includes a selectively operable lever movable to move said spool support away from the disc or to permit movement of said support to engage said disc, and wherein said means for moving said medium is effective selectively to rewind said medium or to drive it in forward direction at standard and fast forward speeds, and said apparatus includes means for operating said lever to move said spool support away from the disc when the medium is being rewound or driven at fast forward speed.

13. In apparatus of the type including a rotatable medium support, means including a selective two-speed drive for rotating said support in one direction at low and high speeds, a belt and pulley drive connected to said support, and means including normally ineffective braking means acting on said belt and pulley drive for decelerating said support for a brief period when the selective drive is changed from high to low speed.

14. In apparatus of the type including a rotatable medium support, means including a selective two-speed drive for rotating said support in one direction at low and high speeds, a belt operatively connected to said support, and means including movable and normally ineffective leaf spring braking means acting on said belt for a brief period for decelerating said support when the selective drive is changed from high to low speed.

15. In apparatus of the type including a rotatable medium support, means including a selective two-speed drive for rotating said support in one direction at low and high speeds, a belt drive connected to said support, and means including normally ineffective one-way braking means acting on said belt and pulley drive for briefly decelerating said support when the selective drive is changed from high to low speed.

16. In apparatus of the type including a rotatable medium support, means including a two-speed drive and selectively movable control means controlling said drive for rotating said support in one direction at low and high speeds, and means including braking means acting on said support for decelerating said support for a brief period and only when the control means is operated to change the drive from high to low speed, said braking means including a braking element, a one-way acting lever arrangement, and means connecting said lever arrangement to said control means.

17. In apparatus of the type including a rotatable record medium support comprising an axially movable shaft, a plate secured to said shaft, a shaft driving disc journalled for rotation on and axially movable on said shaft to one side of said plate, and means for moving said shaft axially to control the driving engagement of said plate and disc, and means including axially movable braking means for moving said drive disc to engage said plate and braking both said disc and plate.

18. In apparatus of the type including a rotatable record medium support comprising a supporting plate, a shaft rotatably mounted on said plate, a shaft driving plate secured to and rotating with said shaft, and means including a yoke having braking elements engageable with said plate secured to it, fixed leg portions secured to said supporting plate, a movable bight portion and means for moving said bight portion to engage said elements with said driving plate for braking said plate and shaft.

References Cited in the file of this patent

UNITED STATES PATENTS

| 1,155,776 | Washburn | Oct. 5, 1915 |
| 1,926,862 | Wellman | Sept. 12, 1933 |
| 2,086,130 | Hickman et al. | July 6, 1937 |
| 2,118,347 | Hardenberg | May 24, 1938 |
| 2,196,738 | Nagel | Apr. 9, 1940 |
| 2,408,320 | Kuhlik | Sept. 24, 1946 |
| 2,417,651 | Kuhlik | Mar. 18, 1947 |
| 2,438,222 | Lear | Mar. 23, 1948 |
| 2,457,699 | Marsen | Dec. 28, 1948 |
| 2,487,976 | Kuhlik | Nov. 15, 1949 |
| 2,500,903 | Neff | Mar. 14, 1950 |
| 2,504,587 | Rey | Apr. 18, 1950 |
| 2,525,926 | Matthews | Oct. 17, 1950 |
| 2,525,995 | Barbara et al. | Oct. 17, 1950 |
| 2,526,783 | Toogood | Oct. 24, 1950 |
| 2,537,260 | Dale | Jan. 9, 1951 |
| 2,538,392 | Somers | Jan. 16, 1951 |
| 2,538,893 | Begun | Jan. 23, 1951 |
| 2,539,521 | Owens | Jan. 30, 1951 |
| 2,553,256 | Hollenbeck | May 15, 1951 |
| 2,555,643 | Harrison | June 5, 1951 |
| 2,558,432 | Haloski | June 26, 1951 |
| 2,560,234 | Masterson | July 10, 1951 |
| 2,585,724 | Barany et al. | Feb. 12, 1952 |
| 2,610,808 | Davis | Sept. 16, 1952 |
| 2,620,404 | Pond | Dec. 2, 1952 |
| 2,623,702 | Masterson | Dec. 30, 1952 |
| 2,625,611 | Roberts | Jan. 13, 1953 |